US008821822B2

(12) United States Patent
Ungar et al.

(10) Patent No.: US 8,821,822 B2
(45) Date of Patent: Sep. 2, 2014

(54) PROCESS AND PLANT FOR RECOVERING $NH_3$ FROM A MIXTURE COMPRISING $NH_3$ AND ACID GASES

(75) Inventors: Gert Ungar, Frankfurt (DE); Matthias Linicus, Eppstein (DE)

(73) Assignee: Lurgi GmbH, Frankfurt am Main (DE)

( * ) Notice: Subject to any disclaimer, the term of this patent is extended or adjusted under 35 U.S.C. 154(b) by 644 days.

(21) Appl. No.: 13/130,258

(22) PCT Filed: Nov. 13, 2009

(86) PCT No.: PCT/EP2009/008113
§ 371 (c)(1),
(2), (4) Date: Jul. 25, 2011

(87) PCT Pub. No.: WO2010/057597
PCT Pub. Date: May 27, 2010

(65) Prior Publication Data
US 2011/0278152 A1  Nov. 17, 2011

(30) Foreign Application Priority Data

Nov. 20, 2008  (DE) .................... 10 2008 058 143

(51) Int. Cl.
*B01D 53/40* (2006.01)
*B01D 53/58* (2006.01)
*B01D 53/78* (2006.01)

(52) U.S. Cl.
USPC ..... 423/237; 423/238; 423/245.1; 423/245.2; 423/168

(58) Field of Classification Search
CPC .......... B01D 53/1425; B01D 53/1462; B01D 53/77; B01D 2251/2062; B01D 2257/304; B01D 2257/504; C01B 17/167; C01C 1/024; C01C 1/10; C01C 1/12
USPC ............. 423/237, 238, 245.1, 245.2; 422/168
See application file for complete search history.

(56) References Cited

U.S. PATENT DOCUMENTS 3,972,693 A * 8/1976 Wiesner et al. ................. 95/158
4,049,782 A * 9/1977 Wohler et al. ................. 423/352
4,060,591 A * 11/1977 Garber et al. ................. 423/352

(Continued)

FOREIGN PATENT DOCUMENTS

EP       0654443      7/1998
GB       768830       2/1957

OTHER PUBLICATIONS

*PCT Notification Concerning Transmittal of International Preliminary Report on Patentability*, from International Application No. PCT/EP2009/008113, mailed Nov. 13, 2009, pp. 1-16.

*Primary Examiner* — Timothy Vanoy
(74) *Attorney, Agent, or Firm* — Pauly, Devries Smith & Deffner, LLC

(57) ABSTRACT

Disclosed herein is a process and a plant for recovering ammonia from a mixture including ammonia, acid gas containing $H_2S$ and/or $CO_2$ and low-boiling water-soluble organic components. To avoid an enrichment of volatile organic compounds in the acid gas absorber, a partial stream of the liquid phase is withdrawn from an acid gas absorber and processed such that gaseous ammonia with a reduced content of volatile organic components is obtained, which is recirculated into the acid gas absorber.

13 Claims, 1 Drawing Sheet

(56) References Cited

U.S. PATENT DOCUMENTS

| | | | |
|---|---|---|---|
| 4,240,808 A | 12/1980 | Garber et al. | |
| 4,738,754 A | 4/1988 | Hilsebein et al. | |
| 5,122,165 A | 6/1992 | Wang et al. | |
| 6,558,452 B1 | 5/2003 | Stönner et al. | |

* cited by examiner

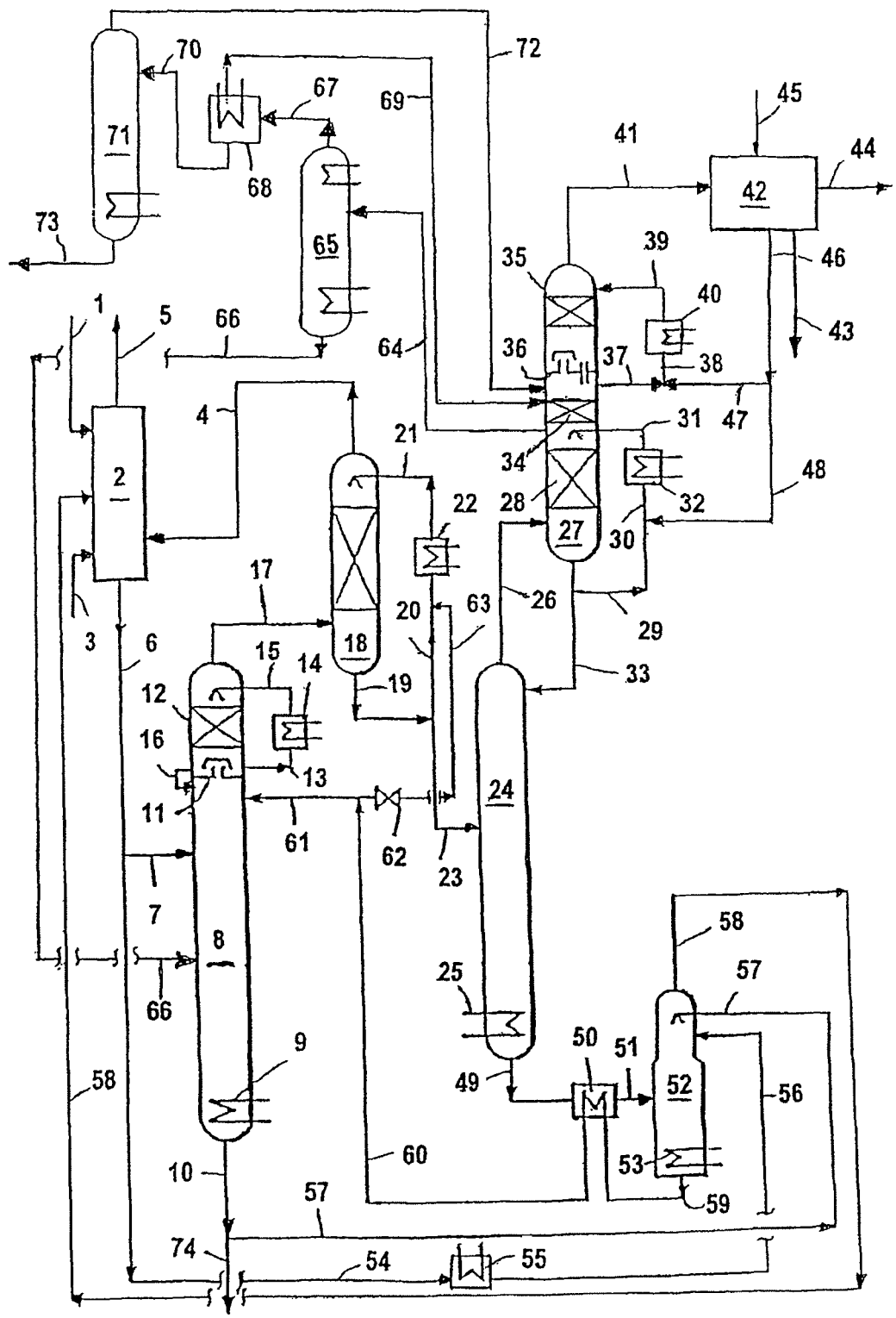

PROCESS AND PLANT FOR RECOVERING $NH_3$ FROM A MIXTURE COMPRISING $NH_3$ AND ACID GASES

CROSS-REFERENCE TO RELATED APPLICATIONS

This application is a national stage application under 35 U.S.C. 371 of International Patent Application Serial No. PCT/EP2009/008113, entitled "Process and Plant for Recovering $NH_3$ from a Mixture Containing $NH_3$ and Acid Gasses," filed Nov. 13, 2009, which claims priority from German Patent Application No. 10 2008 058 143.7, filed Nov. 20, 2008.

FIELD OF THE INVENTION

The present invention relates to a process and a plant for recovering $NH_3$ from a mixture including $NH_3$, acid gas containing $H_{2S}$ and/or $CO_2$, and low-boiling water-soluble organic components, in particular waste water.

BACKGROUND OF THE INVENTION

The separation of $NH_3$ from mixtures including $NH_3$, acid gas containing $H_{2S}$ and/or $CO_2$, and low-boiling water-soluble organic components, in particular waste water is known and based on the fact that $NH_3$ forms azeotropes with the acid gases $CO_2$ and $H_{2S}$ in aqueous solutions—The higher the temperature and the lower the $NH_3$ concentration in the liquid, the poorer the azeotropes in acid gases. In a deacidifier, which operates at a high sump temperature, an acid gas free from $NH_3$ thereby can be obtained as top product, whereas in the sump an aqueous solution is obtained, which contains the entire $NH_3$ and only a small amount of the acid gases from the inlet. In an $NH_3$ stripper, which operates at a low sump temperature and generally with a higher $NH_3$ concentration, a bottom product is obtained, which contains the entire acid gases originating from the deacidifier sump. This requires a relatively small excess of $NH_3$. The top product consists of $NH_3$, which still contains a small concentration of acid gases. In an acid gas absorber, the acid gases are absorbed from the $NH_3$ containing acid gas in aqueous $NH_3$. In a total stripper, all volatile components are stripped from an aqueous solution of $NH_3$, $CO_2$, $H_{2S}$ and a number of further volatile and non-volatile components (depending on the origin of the feedstock), so that a waste water free from volatile components is obtained as bottom product.

Usually, the mixture containing $NH_3$ is added to the sump of the acid gas absorber. To the top of the column, aqueous $NH_3$ or pure water is charged, which absorbs $NH_3$ in a cooled absorption circuit, whereby aqueous $NH_3$ is formed, in which the acid gases are absorbed. The bottom product is supplied to the $NH_3$ stripper, whose head vapors, which still contain some $CO_2$, are introduced into the acid gas absorber. The bottom product of the $NH_3$ stripper is supplied to the deacidifier. To the top of the deacidifier, pure water is added, which also can originate from the sump of the total stripper, in order to completely absorb $NH_3$ from the acid gas. The bottom product of the deacidifier is supplied to the total stripper, whose top product is introduced into the sump of the acid gas absorber. The bottom product is $NH_3$ and waste water free from $CO_2$.

From DE 25 27 985 a variant of this process is known, in which the liquid feedstock is added to the deacidifier. One part of it is added preheated and at the lower part, whereas another part is added further above, in order to condense steam and absorb most of the $NH_3$.

In the process disclosed in EP 0 212 690 B1, the main part of the liquid feedstock is added to the total stripper preheated, whereas the rest is supplied cold to the deacidifier. The top product of the total stripper is largely condensed and then added to the $NH_3$ stripper further down than the sump of the acid gas absorber. This process is particularly favorable with a low acid gas concentration in the feedstock.

In the process according to EP 0 654 443 A1 deacidifier and total stripper are combined in one column. In the middle of the column, deacidified vapors are withdrawn and largely condensed at equal pressure. Further above, the non-condensed vapors are recirculated into the deacidifier. The liquid is introduced into the $NH_3$ absorber, which is combined with the acid gas absorber to one column.

The process according to EP 1 135 331 B1 differs from the process described above in that the head vapors of the total stripper are condensed, wherein the liquid is introduced into the $NH_3$ stripper.

In the process mentioned above, volatile water-soluble organic components in particular in the acid gas absorber can be enriched to such an extent that the processes do not work anymore.

SUMMARY OF THE INVENTION

Therefore, it is the object of the present invention to provide a process and a plant for recovering $NH_3$, in which a strong enrichment of organic components is avoided.

In accordance with the invention, this object is solved in that a partial stream of the liquid phase is withdrawn from the acid gas absorber and processed such that gaseous $NH_3$ with a reduced content of volatile organic components is obtained, which is recirculated into the acid gas absorber.

Surprisingly, it was found that the content of volatile water-soluble organic components in the liquid phase of the acid gas absorber can be limited by means of the process of the invention such that the same do not disturb the smooth operation.

The fractions obtained by processing the withdrawn partial stream of the acid gas absorber, which contain the removed volatile organic components of the liquid phase withdrawn from the acid gas absorber, can be discharged from the process and be supplied to the disposal.

In particular, the process can be employed when the low-boiling water-soluble organic components contain alcohols, ketones, nitriles and/or pyridine bases.

In accordance with a preferred embodiment of the invention, the partial stream withdrawn from the acid gas absorber is supplied to a first stripping column, in which all volatile components largely are stripped. The top product of the stripping column is partially condensed, and the remaining vapors are recirculated into the acid gas absorber. This involves the advantage that a large part of the originally present water-soluble volatile organic compounds remains in the condensed fraction, whereas the recirculated vapors have a smaller content of volatile organic compounds.

To improve the total yield of the process, the partial condensate obtained preferably is supplied to a further stripping column, in which $NH_3$ and acid gases are stripped to such an extent that the organic components are concentrated in the sump. The top product of the second stripping column, whose content of volatile organic compounds correspondingly is further reduced, is recirculated into the acid gas absorber.

It was found that the separation of volatile organic compounds via one or more stripping columns is particularly effective when the stripping column(s) is(are) operated each at a pressure of 2 to 20 bar. Preferably, the pressure is adjusted to 4 to 16 bar, particularly preferably to about 6.5 bar.

In a further embodiment, the bottom product of the second stripping column can be expanded to the pressure of the acid gas absorber and be mixed with the bottom product of a column in which the $NH_3$ is purified, for instance by distillation. In this case, flash vapors are supplied to the acid gas absorber.

It may occur that higher-boiling water-soluble organic components are enriched more in the upper part of the $NH_3$ stripper than in the acid gas absorber. In this case, a liquid or vaporous partial stream can also be withdrawn from the upper part of the $NH_3$ stripper, which is processed as described above.

The $NH_3$ which ultimately is largely liberated from acid gas at the top of the acid gas absorber preferably is supplied to further cleaning stages and/or liquefied.

In accordance with a development of the invention, the aqueous $NH_3$ directed to the acid gas absorber, which serves as absorbent, is split up. One part of the aqueous $NH_3$ is charged to the top of the acid gas absorber and one part of the aqueous $NH_3$ is supplied to the bottommost absorption circuit of the acid gas absorber. Surprisingly, it was found that the total concentration of the volatile organic components in the liquid phase of the acid gas absorber thereby can additionally be reduced.

Furthermore, the present invention relates to a plant for recovering $NH_3$, which in particular is suitable for performing the process described above.

In accordance with the invention, the plant includes an acid gas absorber operated with aqueous $NH_3$, wherein downstream of the acid gas absorber a first stripping column is provided, to which a partial stream of the liquid phase from the acid gas absorber is supplied, and wherein the top of the first stripping column is connected with the acid gas absorber.

To increase the total yield, the plant of the invention includes a further stripping column in accordance with a preferred embodiment, to which the partial condensate of the first stripping column is supplied and in which $NH_3$ and acid gases continue to be stripped, wherein the top of the further stripping column is connected with the acid gas absorber.

The $NH_3$ withdrawn from the acid gas absorber is liquefied in a liquefier, wherein in accordance with a further feature of the invention the liquefier is connected with the top of the acid gas absorber via return conduits.

In addition, a connection of the liquefier with the bottommost absorption circuit of the acid gas absorber is provided via return conduits.

An inventive configuration of the plant consists in that the $NH_3$ stripping column is connected with the first stripping column via a conduit, so as to be able to direct a liquid or vaporous partial stream from the $NH_3$ stripping column onto the first stripping column.

Further features, advantages and possible applications of the invention can also be taken from the following description of embodiments and the drawing. All features described and/or illustrated form the subject-matter of the invention per se or in any combination, independent of their inclusion in the claims or their back-reference.

BRIEF DESCRIPTION OF THE DRAWING

FIG. 1 shows a process flow diagram of a plant for recovering $NH_3$ from a mixture containing $NH_3$ and acid gases in accordance with a preferred embodiment of the present invention.

DETAILED DESCRIPTION

A waste water to be treated, which usually is a condensate from the degasification or gasification of coal, is supplied in conduit 1. In column 2, the waste water is treated with stripping gas from conduit 3, further stripping gas comes from conduits 58 and 4. The loaded stripping gas leaves the column 2 via conduit 5 and is supplied to a non-illustrated processing.

The water coming from the column 2 via conduit 6 now chiefly contains $NH_3$, $CO_2$ and $H_2S$ and a low concentration of further gases. Most of the waste water is charged through conduit 7 to a total stripping column 8 in which all strippable gases are removed from the waste water. In the sump of the total stripping column 8, whose trays are not shown for simplification, a reboiler 9 known per se is provided, which ensures the required buoyancy of the gases. Treated waste water flows off via conduit 10. A small part of the treated waste water is directed to the top of the deacidifier column 52, while the rest leaves the plant via conduit 74. The gases stripped in the total stripping column 8 flow upwards through the gas-permeable tray 11 into the partial condenser 12, in which they are sprinkled with circulating cooled condensate, so as to condense steam above all. Via conduit 13, under the influence of a non-illustrated pump, the condensate flows through an external cooler 14 and via conduit 15 back into the partial condenser 12. Excess condensate is supplied to the total stripping column 8 through the overflow 16.

The top product of the total stripping column 8 leaves the partial condenser 12 in conduit 17 and enters a further condenser 18, in which intensive cooling is effected, so that a liquid phase is formed. The condenser 18 has a liquid circulation through the conduits 19, 20 and 21, wherein temperature is kept low by an external cooler 22. The liquid phase of the condenser 18 absorbs no inert gases such as $N_2$, $H_2$, CO and $CH_4$. The same flow off via conduit 4 and serve as additional stripping gases in column 2.

A partial stream of the liquid phase from conduit 19 is withdrawn via conduit 23 and charged to an $NH_3$ stripping column 24, in whose sump a reboiler 25 is arranged. The $NH_3$ stripping column has e.g. ten to thirty trays, wherein the liquid phase from conduit 23 for instance is supplied to a middle tray. Via conduit 26, the top product of the $NH_3$ stripping column 24, a gas rich in $NH_3$, which contains rests of acid gases, initially is supplied to the acid gas absorber 27 in the first washing stage 28. The same is equipped with an absorption circuit with the conduits 29, 30 and 31 with an external cooler 32. From the sump of the acid gas absorber 27, a partial stream of the absorbate flows as reflux through conduit 33 to the top of the $NH_3$ stripping column 24. Above the washing stage 28 of the acid gas absorber 27, a second washing stage 34 and a third washing stage 35 are located, between which a tray 36 is arranged, which transmits gas to the top and liquid to the bottom. The third washing stage 35 is equipped with an absorption circuit with the conduits 37, 38 and 39 and the external cooler 40. From the third washing stage 35, virtually pure $NH_3$ flows through conduit 41 to the $NH_3$ liquefier 42. Via conduit 43 liquid $NH_3$ and via conduit 44 organic components are discharged from the $NH_3$ liquefier 42 as absorbent, clean water is supplied to the $NH_3$ liquefier 42 via conduit 45. As absorption liquid of the acid gas absorber 27, aqueous $NH_3$ from the $NH_3$ liquefier 42 is used, which is discharged via conduit 46 and for one part fed into conduit 37 and supplied to the washing stage 35 via conduit 47 and for the other part is fed into conduit 30 of the absorption circuit of the washing stage 28 via conduit 48.

Under the influence of a non-illustrated pump, the water withdrawn from the sump of the $NH_3$ stripping column 24 initially flows through conduit 49 to a heat exchanger 50 and through conduit 51 into the deacidifier column 52, in which a gas mixture rich in $NH_3$, $CO_2$ and $H_2S$ is stripped by means of the reboiler 53. After passing through the heat exchanger 55, the water withdrawn from the sump of column 2 via conduit 6 flows through the conduits 54 and 56 to the deacidifier column 52. Further above, cooled water discharged from the total stripping column 8 is fed into the deacidifier column via conduit 57. The gas mixture is washed with the cooled water, before it is supplied via conduit 58 to column 2 for further processing as stripping gas. In the deacidifier column 52, deacidified water is obtained as bottom product, which contains $NH_3$ and minor amounts of $CO_2$ and $H_2S$. This bottom product is withdrawn via conduit 59 and initially releases part of its heat in the heat exchanger 50 and then partly flows into the total stripping column 8 via the conduits 60 and 61. A partial stream adjustable by the valve 62 is discharged via conduit 63 and admixed to the liquid phase, which flows off from the condenser column 18 via the conduits 19, 20.

Via conduit 64, part of the liquid phase of the acid gas absorber 27 is supplied to a first stripping column 65, in which $NH_3$, acid gases and volatile organic components largely are stripped. Via conduit 66, the bottom product of the first stripping column 65 is conveyed onto a lower tray of the total stripping column 8. Via conduit 67, the top product of the first stripping column 65 is supplied to a condenser 68 and cooled to a temperature achievable with cooling water. Most of the water and the organic components is condensed, and part of the $NH_3$ and the acid gases is absorbed.

Via conduit 69 the vapors are recirculated into the acid gas absorber 27, and via conduit 70 the liquid phase is charged to a second stripping column 71, in which $NH_3$ and acid gases are stripped to such an extent that the organic components are concentrated in the sump and only for a small part leave the stripping column 71 with the top product. The top product is recirculated to the acid gas absorber 27 via conduit 72.

In a particular embodiment, part of the recirculated aqueous $NH_3$ withdrawn via conduit 46 is branched off and not supplied to the top of the acid gas absorber 27 via the conduits 47 and 39, but via the conduits 48, 30 and 31 to the lower absorption circuit of the acid gas absorber 27 via the external cooler 32. While, as described in the preferred embodiment, total concentrations of the organic components in the liquid phase of the acid gas absorber 27 of 17.5 wt-% are achieved by supplying the aqueous $NH_3$ as absorbent exclusively to the top of the acid gas absorber 27, the concentration can be reduced to 9.5 wt-% by introducing a partial stream into the lower absorption circuit of the acid gas absorber 27.

The bottom product of the second stripping column 71 can be supplied via conduit 73 to a further disposal or, upon mixing with the cooled bottom product of a column in which the $NH_3$ is purified for instance by distillation, be expanded to the pressure of the acid gas absorber 27. Then, the flash vapor also is supplied to the acid gas absorber 27.

EXAMPLE

In a procedure corresponding to the drawing, the contents of $NH_3$, $CO_2$, $H_2S$, $H_2O$ and organic compounds as indicated in Table 1 were determined for the various conduits:

TABLE 1

| Conduit | $H_2O$ [kmol/h] | $NH_3$ [kmol/h] | $H_2S$ [kmol/h] | $CO_2$ [kmol/h] | Org. comp. [kmol/h] | Temp. [°C.] | Pressure [bar] |
|---|---|---|---|---|---|---|---|
| 1 | 193448.9 | 932.7 | 26.1 | 856.6 | 50.2 | 43 | 6 |
| 3 | 23.8 | 0.0 | 8.1 | 304.2 | 0.0 | 47 | 2 |
| 5 | 90.7 | 0.1 | 30.9 | 1159.9 | 0.8 | 46 | 2 |
| 6 | 193373.7 | 953.8 | 231.2 | 184.8 | 51.2 | 110 | 2 |
| 23 | 11092.4 | 4245.4 | 696.2 | 203.0 | 201.0 | 60 | 3 |
| 26 | 61.1 | 1336.8 | 24.5 | 0.1 | 106.1 | 62 | 3 |
| 33 | 832.6 | 469.9 | 23.1 | 0.1 | 59.3 | 50 | 3 |
| 74 | 194450.8 | 2.1 | 0.0 | 0.0 | 0.4 | 63 | 19 |
| 43 | 0.0 | 809.2 | 0.0 | 0.0 | 0.0 | 43 | 18 |
| 49 | 11864.0 | 3378.5 | 694.8 | 203.0 | 154.2 | 84 | 3 |
| 57 | 9088.6 | 44.8 | 10.9 | 8.7 | 2.4 | 40 | 16 |
| 58 | 3.4 | 0.0 | 227.3 | 184.6 | 0.0 | 45 | 14 |
| 59 | 21970.5 | 3423.3 | 478.6 | 27.0 | 166.6 | 154 | 14 |
| 63 | 8832.1 | 1376.2 | 192.4 | 10.8 | 63 | 93 | 11 |
| 64 | 337.6 | 171.2 | 1.6 | 0.0 | 20.9 | 51 | 7 |
| 66 | 313.4 | 0.0 | 0.0 | 0.0 | 0.0 | 163 | 7 |
| 67 | 24.2 | 171.2 | 1.6 | 0.0 | 20.9 | 100 | 6 |
| 69 | 0.2 | 118.8 | 0.0 | 0.0 | 7.0 | 36 | 3 |
| 70 | 24.0 | 52.4 | 1.5 | 0.0 | 13.9 | 50 | 6 |
| 72 | 0.2 | 39.8 | 0.1 | 0.0 | 0.5 | 40 | 3 |
| 73 | 23.8 | 12.7 | 1.4 | 0.0 | 13.4 | 90 | 6 |
| 44 | 23.3 | 48.4 | 0.0 | 0.0 | 34.2 | 95 | 17 |
| 47 | 576.1 | 210.3 | 0.0 | 0.0 | 8.7 | 70 | 17 |
| 48 | 562.9 | 205.5 | 0.0 | 0.0 | 8.5 | 70 | 17 |
| 45 | 1132.4 | 0.0 | 0.0 | 0.0 | 0.0 | 40 | 5 |

| List of Reference Numerals | |
|---|---|
| 2 | stripping gas column |
| 8 | total stripping column |
| 9 | reboiler |
| 11 | gas-permeable tray |
| 12 | partial condenser |
| 14 | cooler |
| 16 | overflow |
| 18 | condenser column |
| 22 | cooler |
| 24 | $NH_3$ stripping column |
| 28 | washing stage |
| 32 | cooler |
| 27 | acid gas absorber |
| 35 | washing stage |
| 36 | overflow |
| 40 | cooler |
| 42 | $NH_3$ liquefier |
| 50 | heat exchanger |

| | List of Reference Numerals |
|---|---|
| 52 | deacidifier column |
| 53 | reboiler |
| 65 | first stripping column |
| 68 | condenser |
| 71 | second stripping column |

The remaining reference numerals refer to conduits.

The invention claimed is:

1. A process for recovering $NH_3$ from a mixture of $NH_3$, acid gas containing $H_2S$, $CO_2$, or a combination thereof, and low-boiling water-soluble organic components, in which the acid gas is absorbed with aqueous $NH_3$ in an acid gas absorber and at the top of the acid gas absorber $NH_3$ largely liberated from acid gas is removed, wherein a partial stream of the liquid phase is withdrawn from the acid gas absorber and processed such that gaseous $NH_3$ with a reduced content of volatile organic components is obtained, the $NH_3$ being recirculated into the acid gas absorber.

2. The process according to claim 1, wherein the partial stream withdrawn from the acid gas absorber is supplied to a first stripping column, in which the volatile components largely are stripped, the top product of the stripping column is partially condensed, and the remaining vapors are recirculated into the acid gas absorber.

3. The process according to claim 2, wherein the partial condensate of the first stripping column is supplied to a further stripping column, in which $NH_3$ and acid gases are stripped to such an extent that the organic components are concentrated in the sump, and that the top product of the further stripping column is recirculated into the acid gas absorber.

4. The process according to claim 2, wherein the stripping column(s) is/are operated at a pressure of 2 to 20 bar[a].

5. The process according to claim 2, wherein the bottom product of the further stripping column is expanded to the pressure of the acid gas absorber, is mixed with the bottom product of a column in which the $NH_3$ is purified, and the flash vapors are supplied to the acid gas absorber.

6. The process according to claim 1, wherein the aqueous $NH_3$ conveyed to the acid gas absorber is split up, and one part of the aqueous $NH_3$ is charged to the top of the acid gas absorber and one part of the aqueous $NH_3$ is supplied to the bottommost absorption circuit of the acid gas absorber.

7. The process according to claim 2, wherein a liquid or vaporous partial stream is withdrawn from the $NH_3$ stripping column and supplied to the first stripping column.

8. A plant for recovering $NH_3$ according to claim 1, which includes an acid gas absorber operated with aqueous $NH_3$, wherein downstream of the acid gas absorber a first stripping column is provided, to which a partial stream of the liquid phase from the acid gas absorber is supplied, and the top of the first stripping column is connected with the acid gas absorber.

9. The plant according to claim 8, comprising a further stripping column, to which partial condensate of the first stripping column is supplied and in which $NH_3$ and acid gases continue to be stripped, wherein the top of the further stripping column is connected with the acid gas absorber.

10. The plant according to claim 8, wherein the $NH_3$ withdrawn from the acid gas absorber is liquefied in a liquefier, wherein the liquefier is connected with the top of the acid gas absorber via one or more return conduits.

11. The plant according to claim 10, wherein the liquefier is connected with the bottommost absorption circuit of the acid gas absorber via one or more return conduits.

12. The process according to claim 2, wherein the stripping column(s) is/are operated at a pressure of 4 to 16 bar[a].

13. The process according to claim 3, wherein the bottom product of the further stripping column is expanded to the pressure of the acid gas absorber, is mixed with the bottom product of a column in which the $NH_3$ is purified by distillation, and the flash vapors are supplied to the acid gas absorber.

* * * * *